United States Patent [19]
Sekine et al.

[11] Patent Number: 5,808,660
[45] Date of Patent: Sep. 15, 1998

[54] VIDEO ON-DEMAND SYSTEM WITH A PLURALITY OF RECEPTION APPARATUS CONNECTED IN A DAISY CHAIN CONNECTION

[75] Inventors: Kazutoyo Sekine, Kanagawa; Yoshiyuki Kondo, Saitama, both of Japan

[73] Assignee: Sony Corporation, Tokyo, Japan

[21] Appl. No.: 706,291

[22] Filed: Sep. 4, 1996

[30] Foreign Application Priority Data

Sep. 5, 1995 [JP] Japan .................................. 7-251890

[51] Int. Cl.$^6$ ..................................................... H04N 7/10
[52] U.S. Cl. .................................. 348/8; 348/12; 348/7; 455/6.2; 455/6.3; 455/5.1
[58] Field of Search .................................. 348/8, 6, 7, 12, 348/13; 455/6.2, 6.3, 4.2, 5.1; H04N 7/16, 7/173, 7/10

[56] References Cited

U.S. PATENT DOCUMENTS

| | | | |
|---|---|---|---|
| 4,835,604 | 5/1989 | Kondo | 348/8 |
| 4,866,515 | 9/1989 | Tagawa | 348/8 |
| 5,057,915 | 10/1991 | Von Kohorn | 348/8 |

*Primary Examiner*—Sherrie Hsia
*Attorney, Agent, or Firm*—Jay H. Maioli

[57] ABSTRACT

A communication line used for connection of a system such as a video on-demand system which includes a delivery apparatus and a plurality of reception apparatus is formed from a data line to be used to serially transmit video information at a data rate equal to or higher than 100 MBps, a strobe line to be used to transmit a strobe signal for regeneration of a clock signal, and a power supply line to be used to supply power, and the delivery apparatus and the plurality of reception apparatus are connected by a daisy chain connection by the communication line. The wiring line length can be minimized by the daisy chain connection, and the system can be applied readily to a location wherein a space which can be used for installation of wiring lines is physically limited such as in an aircraft.

27 Claims, 11 Drawing Sheets

FIG. 2
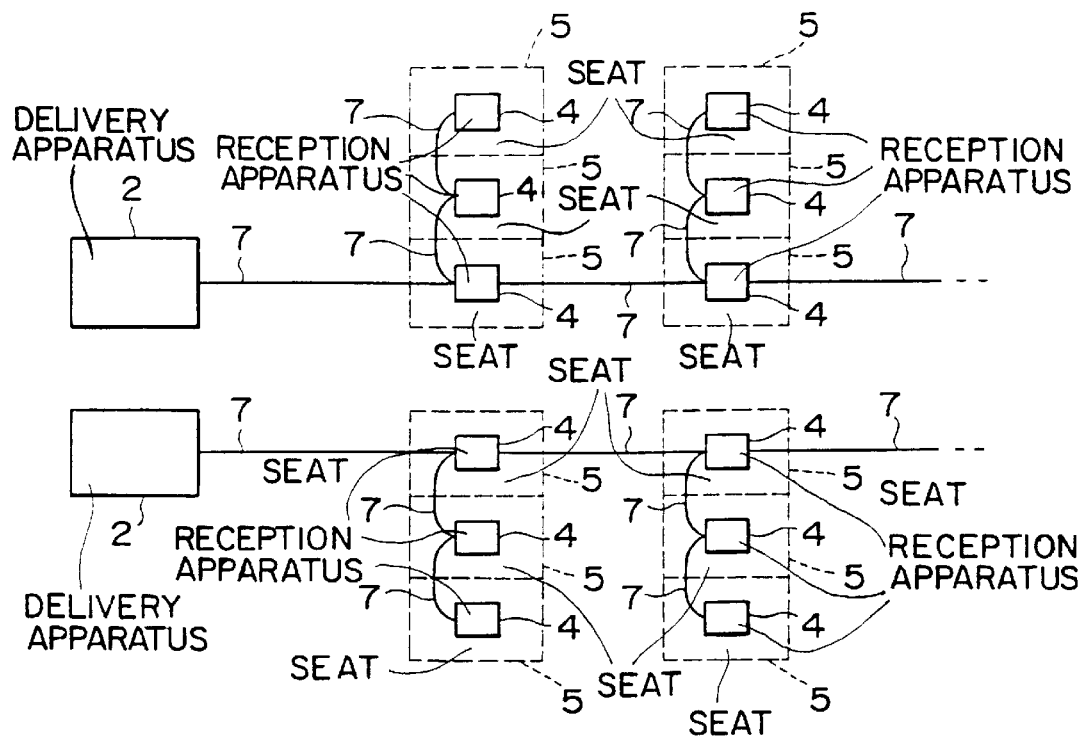
FIG. 4A
DATA
FIG. 4B
STRB
FIG. 4C
DATA ^ STRB
(DELAYED)
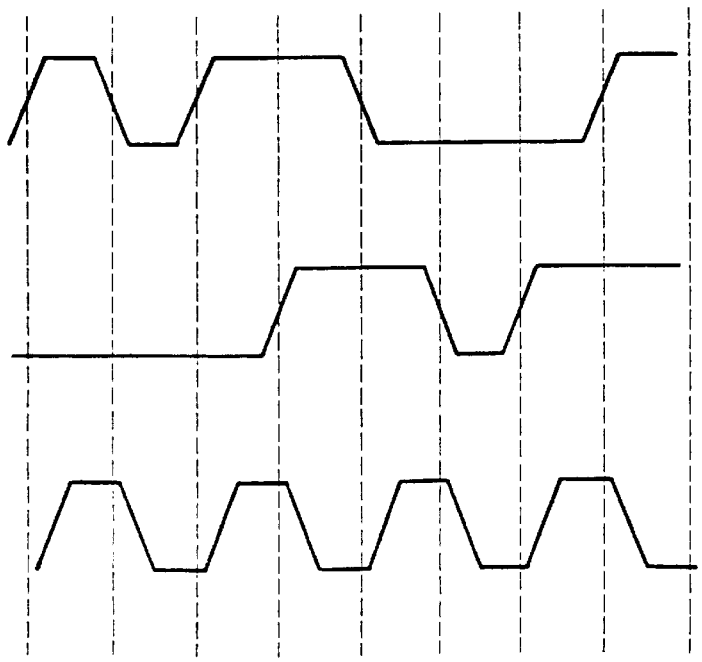

F I G. 3
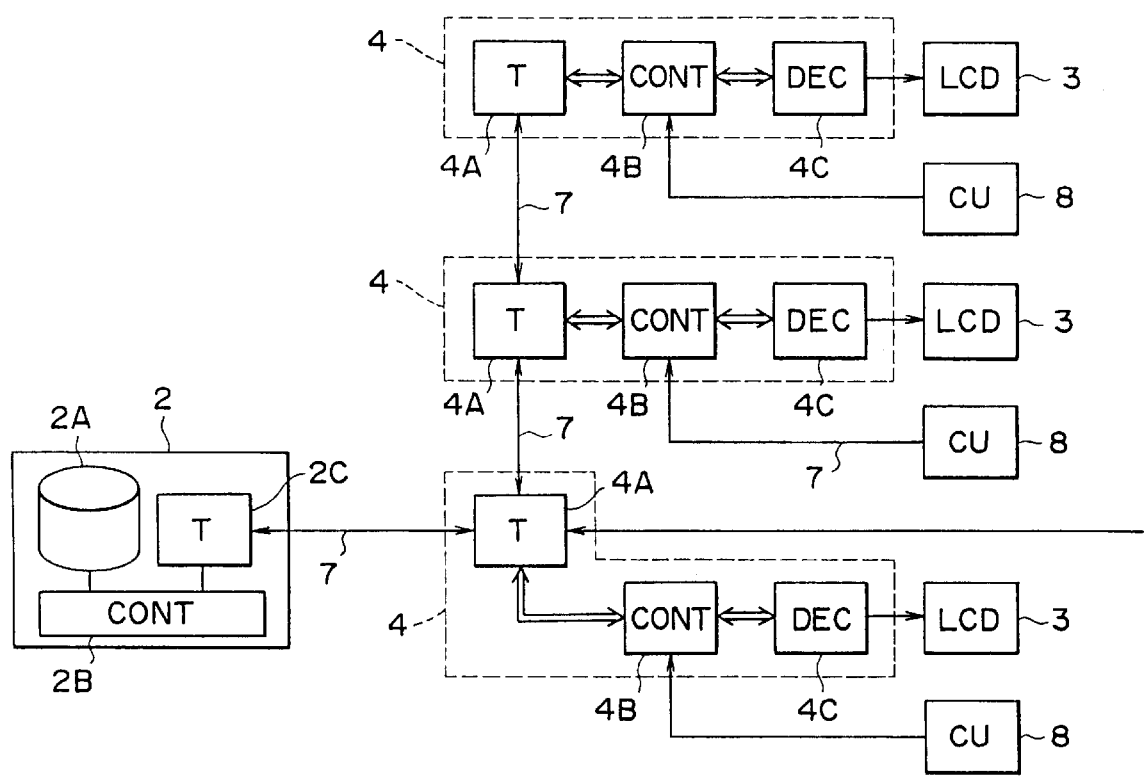

ENCODER

DECODER

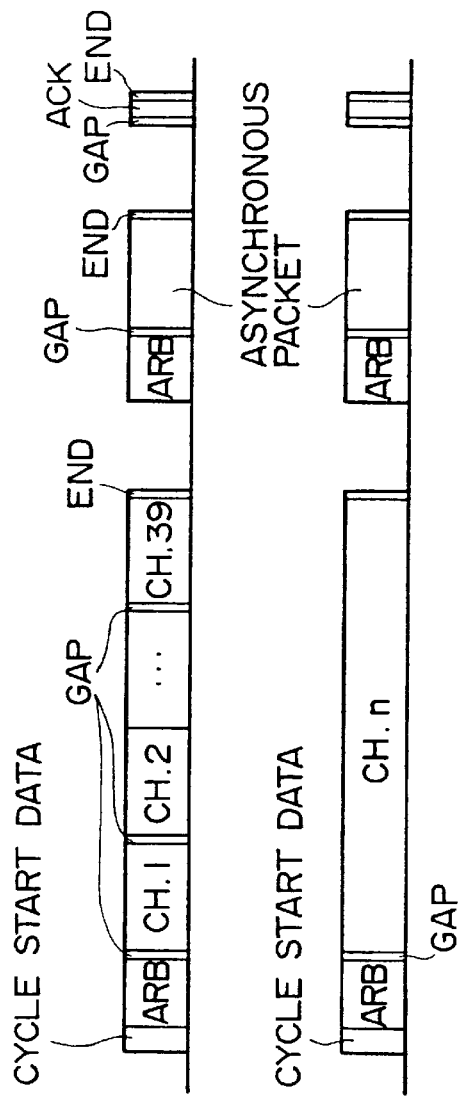

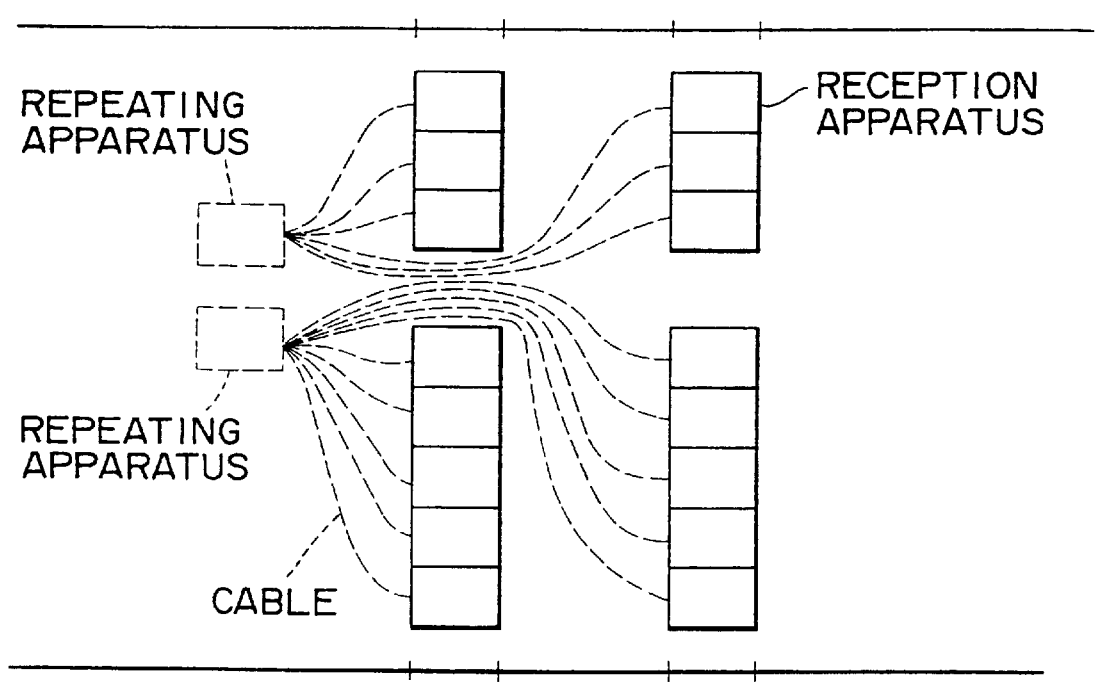
F I G. 14

VIDEO ON-DEMAND SYSTEM WITH A PLURALITY OF RECEPTION APPARATUS CONNECTED IN A DAISY CHAIN CONNECTION

BACKGROUND OF THE INVENTION

This invention relates to a video on-demand system, and more particularly to a video on-demand system which is suitably used in a situation wherein an installation space is limited such as in an aircraft.

Nowadays, a video distribution system (hereinafter referred to as video on-demand system) which can provide, to each viewer, a video program desired by the viewer in response to a request of the viewer is being put to practical use. At present, the video on-demand system is being developed as a system which interconnects a distribution center which principally distributes video programs and houses of individuals. However, if the system can be utilized in such a mobile object as an aircraft, improvement in service to passengers can be anticipated.

However, the bit rate of compressed moving pictures distributed using a system of the type described above at present is as high as 1.5 to 4.0 Mbps, and if it is tried to provide video programs individually to 50 to 60 passengers, then the transmission amount comes up to 75 to 240 Mbps. An ATM (Asynchronous Transfer Mode) is known as a data switching system which can distribute such a large amount of data on a real-time basis from a delivery apparatus side to reception apparatus (including repeating apparatus). This data switching system, however, is disadvantageous in that the system itself is expensive. Further, as a connection form between the delivery apparatus and the reception apparatus, it cannot be avoided to adopt such a point-to-point type connection form as shown in FIG. 12. Consequently, as the number of reception apparatus increases, also the number of lines increases. Accordingly, the data switching system is disadvantageous also in that, where it is utilized in a location where the space is physically limited such as in an aircraft, the number of reception apparatus to be connected cannot be increased readily because of the difficulty in adding wiring lines.

It seems a promising idea to use a line conforming to the network standard called Fast Ethernet to increase the number of reception apparatus to be connected to a delivery apparatus via a hub (repeater) as seen in FIG. 13. However, where an Ethernet line is used, since the hub (repeater) and the reception apparatus must be connected by a star type connection, if it is attempted to install cables in an aircraft, then it cannot be avoided to adopt such a connection configuration wherein a plurality of reception apparatus are connected directly to a repeater as seen in FIG. 14.

However, where an aircraft is concerned, since the spaces which can be used to receive such wiring lines are limited to existing guide grooves provided below the seats, the number of cables which can be installed in the aircraft has a physical upper limit.

Further, where an aircraft is concerned, the layout of seats is sometimes changed in accordance with a demand of passengers. However, where the system which includes cables of various lengths is installed in the aircraft, there is a problem in that, each time the layout of seats is changed, the cables must be re-installed, which is not practical.

In order to eliminate the problem just described, the reception apparatus are preferably connected to each other by a daisy chain connection. However, where the Ethernet is involved, a daisy chain connection between terminals is impossible and does not match with the physical environment.

It is to be noted that the daisy chain connection here denotes a form of connection wherein a plurality of reception apparatus each having input terminals and output terminals and having a function of delivering all signals from the input terminals to the output terminals and another function of selectively receiving and processing only a desired one or ones of the signals from the input terminals are connected in cascade connection by the input terminals and the output terminals thereof via lines.

SUMMARY OF THE INVENTION

It is an object of the present invention to provide a video on-demand system which can be applied readily also where the space which can be used for installation of wiring lines is physically limited.

In order to attain the object described above, according to an aspect of the present invention, there is provided a video on-demand system wherein a plurality of video programs are selectively supplied and displayed in response to requests of viewers in a physically limited space, which comprises a delivery apparatus for selectively reading out and delivering, in response to request signals, video information of the video programs each in the form of compressed codes stored in storage means, a communication line including a set of lines including a data line for serially transmitting the video information at a data rate equal to or higher than 100 MBps, a strobe line for transmitting a strobe signal for regeneration of a clock signal to be used to transmit the video information and a power supply line for supplying dc power, a plurality of reception apparatus connected in a daisy chain connection to the delivery apparatus by the communication line for outputting the request signals and selectively receiving the video information, a plurality of reception apparatus installation means arranged in a predetermined form and having the plurality of reception apparatus installed individually therein for allowing the viewers to enjoy the video programs selected by the viewers, and a line laying means provided between the delivery apparatus and the plurality of reception apparatus and connecting the plurality of reception apparatus in a daisy chain connection to the transmission apparatus.

According to another aspect of the present invention, there is provided a video on-demand system wherein a plurality of video programs are selectively supplied and displayed in response to requests of viewers in a physically limited space, which comprises a delivery apparatus for selectively reading out and delivering, in response to request signals, video information of the video programs each in the form of compressed codes stored in storage means via an asynchronous or synchronous serial interface, a converter for converting the video information delivered from the transmission apparatus into a set of the video information and a strobe signal for regeneration of a clock signal of the video information, a communication line including a set of lines including a data line for serially transmitting the video information obtained by the conversion of the converter at a data rate equal to or higher than 100 MBps, a strobe line for transmitting a strobe signal for regeneration of a clock signal to be used to transmit the video information and a power supply line for supplying dc power, a plurality of reception apparatus connected in a daisy chain connection to the delivery apparatus by the communication line for outputting the request signals and selectively receiving the video information, a plurality of reception apparatus installation means arranged in a predetermined form and having the plurality of reception apparatus installed individually therein for allowing the viewers to enjoy the video programs selected by the viewers, and a line laying means provided between the delivery apparatus and the plurality of reception apparatus and connecting the plurality of reception apparatus in a daisy chain connection to the transmission apparatus.

According to a further aspect of the present invention, there is provided a video on-demand system wherein a plurality of video programs are selectively supplied and displayed in response to requests of viewers in a physically limited space, which comprises a plurality of delivery apparatus for selectively reading out and delivering, in response to request signals, video information of the video programs each in the form of compressed codes stored in storage means, an exchange for selectively connecting the plurality of delivery apparatus and a first communication line, a converter for converting the video information supplied thereto from the exchange via the first line into a set of the video information and a strobe signal for regeneration of a clock signal of the video information, a second communication line including a set of lines including a data line for serially transmitting the video information obtained by the conversion of the converter at a data rate equal to or higher than 100 MBps, a strobe line for transmitting a strobe signal for regeneration of a clock signal to be used to transmit the video information and a power supply line for supplying dc power, a plurality of reception apparatus connected in a daisy chain connection to the delivery apparatus by the second communication line for outputting the request signals and selectively receiving the video information, a plurality of reception apparatus installation means arranged in a predetermined form and having the plurality of reception apparatus installed individually therein for allowing the viewers to enjoy the video programs selected by the viewers, and a line laying means provided between the delivery apparatus and the plurality of reception apparatus and connecting the plurality of reception apparatus in a daisy chain connection to the transmission apparatus.

With the video on-demand systems according to the first- to third-mentioned aspects of the present invention, since they are constructed in such a manner as described above, the length of the cable required to connect the reception apparatus to each other can be reduced remarkably comparing with that of related art video on-demand systems. Further, since the connection form is very simple, the cable can be laid readily irrespective of a physical restriction in construction of a system.

More particularly, with the systems of the present invention, since the communication line for use for interconnection between the delivery apparatus and the plurality of reception apparatus includes a data line for serially transmitting video information at a data rate equal to or higher than 100 MBps, a strobe line for transmitting a strobe signal for regeneration of a clock signal and a power supply line for supplying dc power and the delivery apparatus and the plurality of reception apparatus are connected in a daisy chain connection, the wiring line length can be minimized. Consequently, the video on-demand systems can be applied readily to a location wherein the space which can be used to install wiring lines therein is physically limited such as, for example, in an aircraft.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagrammatic view showing a network configuration employed in the video on-demand system shown in FIG. 1;

FIG. 3 is a block diagram showing internal constructions of a delivery apparatus and a reception apparatus of the video on-demand system of FIG. 1;

FIGS. 4A to 4C are signal waveform diagrams illustrating a bidirectional serial transmission standard used in the video on-demand system of FIG. 1;

FIGS. 6A and 6B are diagrammatic views showing data structures in one cycle;

FIGS. 7A and 7B are diagrammatic views illustrating different data transmission protocols;

FIG. 14 is a diagrammatic view showing a wiring scheme where a related art system is employed.

DESCRIPTION OF THE PREFERRED EMBODIMENTS

1. Small Scale Video On-Demand System

1—1. Basic System Configuration

Figure 1:
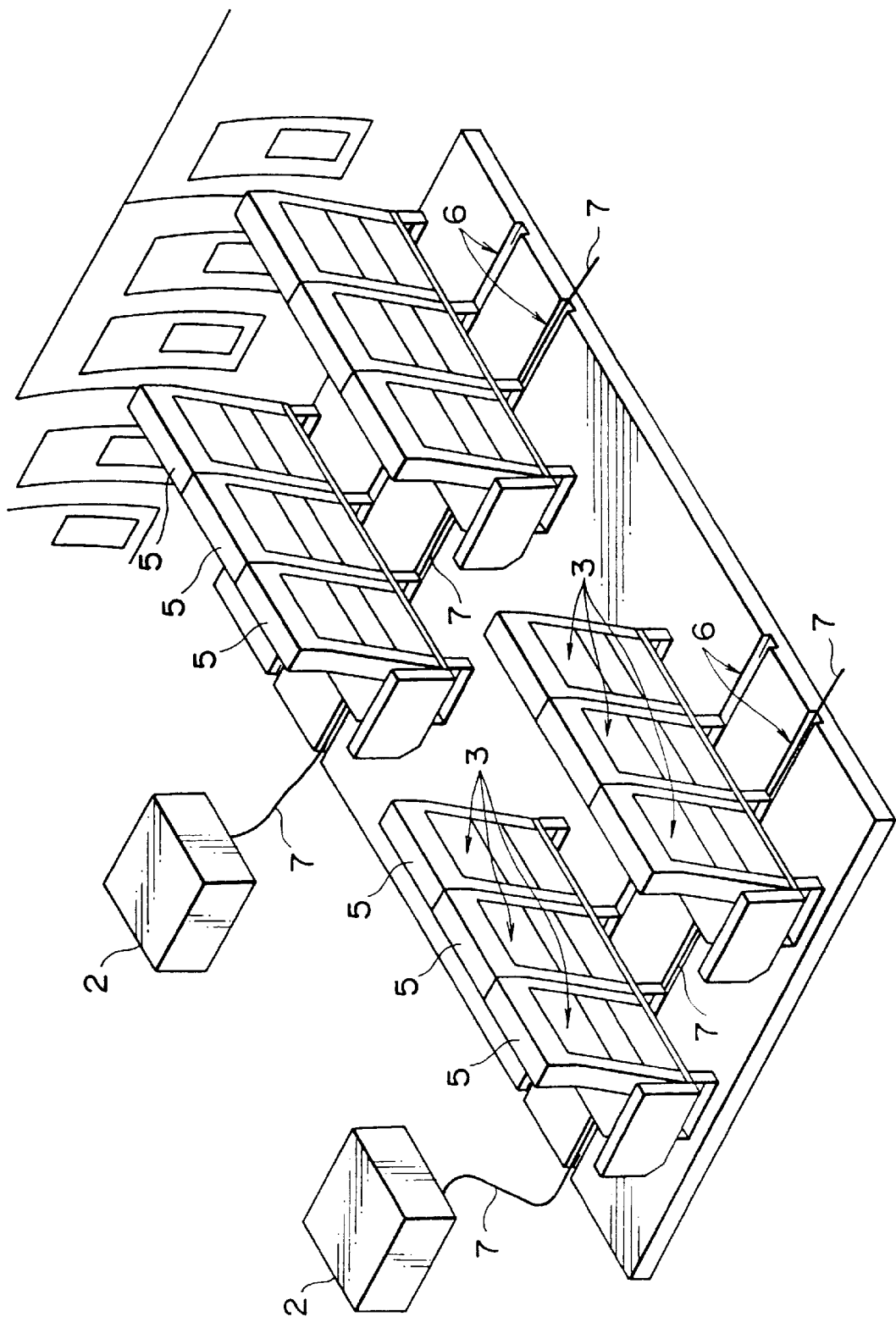
FIG. 1 is a perspective view of an example of a construction of a video on-demand system showing a preferred embodiment of the present invention.

FIG. 1 shows a basic system configuration which is common to video on-demand systems which can be constructed in an aircraft. More particularly, FIG. 1 shows a general configuration of an video on-demand system which provides video programs (video data (including still picture data) and audio data) to passengers in a passenger cabin of an aircraft in which seats are arranged in a plurality of rows along an aisle such that three seats are arranged on each of the opposite sides of the aisle in each row. It is to be noted that a pair of video on-demand systems are provided independently of each other for the seats on the opposite sides of the aisle and each of the video on-demand systems shown in FIG. 1 is of such a small scale that 50 to 60 reception apparatus are connected to one delivery apparatus.

Referring to FIGS. 1 and 2, each of the video on-demand systems generally includes a delivery apparatus 2 for delivering video programs into a transmission line in response to requests of passengers, and a plurality of reception apparatus 4 each for receiving a video program destined for the reception apparatus 4 itself from among the video programs transmitted via the transmission line and displaying the received video program on a display unit 3.

It is to be noted that the display unit 3 is provided on the rear side of the seat back of each of seats 5 so that a passenger on the seat behind the seat 5 may watch the display unit 3, and though not shown, each of the reception apparatus 4 is provided below each seat 5.

The video on-demand system transmits information in conformity with IEEE 1394 which is a bi-directional serial transmission standard which will be hereinafter described such that the reception apparatus 4 are connected to each other by a daisy chain connection. Consequently, the video on-demand system has such a very simplified network configuration as seen in FIG. 2 by the daisy chain connection.

In particular, the network configuration can be constructed from a single transmission line extending in series from the front seat row toward the rear seat row along one of guide grooves 6 formed on the floor below columns of the seats with the reception apparatus 4 interposed therein, and another transmission line provided for each seat row and extending in series from one of the reception apparatus 4 for a seat at an end of the seat row to another one of the reception apparatus 4 for another seat at the other end of the seat row with an intermediate reception apparatus 4 interposed therein. It is to be noted that, although each of the reception apparatus 4 has a plurality of input and/or output terminals for allowing bidirectional data transmission, FIG. 2 does not particularly show the individual input/output terminals but only represents the connection relationship equivalently.

Accordingly, the guide groove 6 is required to receive, at any location thereof, only one transmission cable 7 which connects the associated reception apparatus 4 in series, and need not receive a number of transmission cables 7 equal to the number of reception apparatus 4 connected to the delivery apparatus 2 which is different from the related art system.

Accordingly, an operation for constructing a network system can be carried out without being restricted from spaces in which transmission cables can be installed, and the present system is convenient also for a designer when the designer carries out designing of the same.

Further, it is required to prepare, for the transmission cables 7, only two different types of transmission cables including a transmission cable of a length sufficient to allow connection between two reception apparatus for two adjacent seats on the same row of the seats which are arranged in an equally spaced relationship from each other and another transmission cable of a length sufficient to allow connection between two reception apparatus for two adjacent seats between two front and rear adjacent seat rows. Consequently, the cost required for maintenance and so forth can be reduced.

Further, also when to change the layout to install an additional seat, it is only required to connect a transmission cable from the reception apparatus 4 for an existing seat 5 to the reception apparatus when a set is to be newly installed. Consequently, an operation for installing additional transmission apparatus can be completed very readily in a short time.

On the other hand when it is desired to change the layout to decrease the number of seats, a physical changing operation of the network can be completed by only removing each transmission cable 7 which extends from a reception apparatus 4 for a seat to be removed to another reception apparatus 4 for an adjacent seat.

1–2. Construction of Individual Components

Detailed construction of the individual components of the video on-demand system 1 will be described below with reference to FIG. 3.

The delivery apparatus 2, which serves as a server, includes a recording apparatus 2A which may be a hard disk apparatus or like apparatus having a large recording capacity, a control apparatus 2B for controlling the recording apparatus 2A, and a transmission and reception apparatus 2C for transmitting and receiving data in conformity with the bidirectional serial transmission standard IEEE 1394 which will be hereinafter described.

It is assumed here that the recording apparatus 2A has various video programs stored therein so as to satisfy various requests of passengers. Further, the recording apparatus 2A stores the video programs in two picture qualities for an ordinary image (MPEG1 format image) and a high definition image (MPEG2 format image) which is higher in definition than the ordinary image, and can switchably deliver a different one of the images depending upon the type of an apparatus connected to the network such as, for example, a reception apparatus wherein an image is displayed on a liquid crystal display unit or another reception apparatus wherein an image is displayed using a projector.

The control apparatus 2B controls a reading out operation of the recording apparatus 2A in response to a request from any reception apparatus 4 received via the transmission and reception apparatus 2C, converts a video program read out in response to such request, adds a header to each packet and outputs resulting packets to the transmission and reception apparatus 2C.

The transmission and reception apparatus 2C transmits and receives information of a video program and so forth at one of transmission rates of 100 MBps, 200 MBps and 400 MBps in accordance with a transmission rate permitted by the constructed network system.

Meanwhile, each of the reception apparatus 4 provided for the individual seats 5 includes a transmission and reception apparatus 4A for receiving video programs delivered from the delivery apparatus 2, a control apparatus 4B for extracting an information program destined for the reception apparatus 4 from among the received video programs, and a decoding apparatus 4C for decoding the extracted information program into a video signal. Incidentally, a control unit 8 is connected to the control apparatus 4B, and the control apparatus 4B delivers an instruction corresponding to a request inputted from the control unit 8 as control data to the delivery apparatus 2. It is to be noted that the transmission and reception apparatus 4A has a plurality of, actually three, input and/or output terminals for bidirectional data transmission and functions so that all signals from the input terminals are delivered to the output terminals.

The control unit 8 is an operation terminal for a passenger which is removably fixed to an arm rest or a like part of a seat 5 and can input various operations such as selection, reproduction, pause, fast forward and rewinding of a video program therethrough.

The decoding apparatus 4C decodes a video program transmitted thereto as a compression coded signal and displays the decoded video program on the display unit 3. Incidentally, in the present embodiment, a liquid crystal display unit is used for the display unit 3.

1–3. Bidirectional Serial Transmission Standard IEEE 1394

Subsequently, the bidirectional serial transmission standard IEEE 1394 employed in the video on-demand system 1 will be described. The bidirectional serial transmission standard IEEE 1394 employed in the video on-demand system 1 requires a transmission cable 7 including three lines consisting of a power supply line, a data line and a strobe line and communicates data at a transmission rate at least equal to or higher than 100 MBps. Incidentally, in the video on-demand system shown in FIG. 3, one of the three transmission rates of 100 MBps, 200 MBps and 400 MBpS can be selected.

The power supply line is used to supply dc power to various apparatus connected thereto, and even when it is desired to change the layout such as installation of an additional equipment, the network can be modified without taking the supply of power into consideration. It is to be noted that, where a repeater is employed, since the power can be supplied via the repeater due to the presence of the power supply line, the reception apparatus 4 can be used always in an active state, and a video program can be transmitted to the reception apparatus 4 without taking the possibility of reflection from or interference by another reception apparatus 4 into consideration.

The data line is a single data line which is used to transmit data regarding a video program. The data line serially transmits NRZ-coded NRZ data as seen from FIG. 4A.

The strobe line transmits a strobe signal which changes the state thereof as seen in FIG. 4B when two successive bits of NRZ data exhibit the same state. By logically exclusively ORing the strobe signal transmitted via the strobe line and the NRZ data, a clock signal can be regenerated on the reception side as seen in FIG. 4C. Consequently, data can be transmitted without an error irrespective of transmission delay of the signal.

Figure 5A:
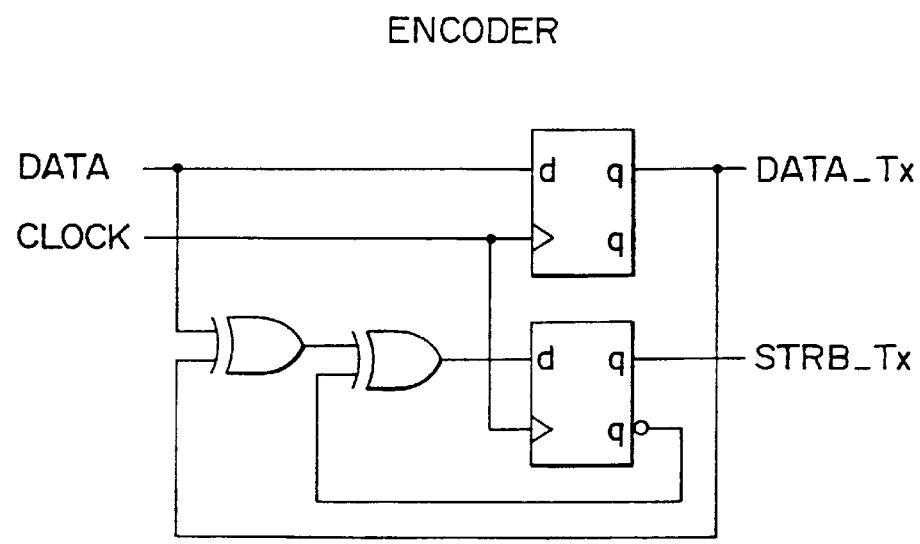
FIGS. 5A and 5B are block diagrams showing constructions of an encoder and a decoder of the video on-demand system of FIG. 1, respectively.
Figure 5B:
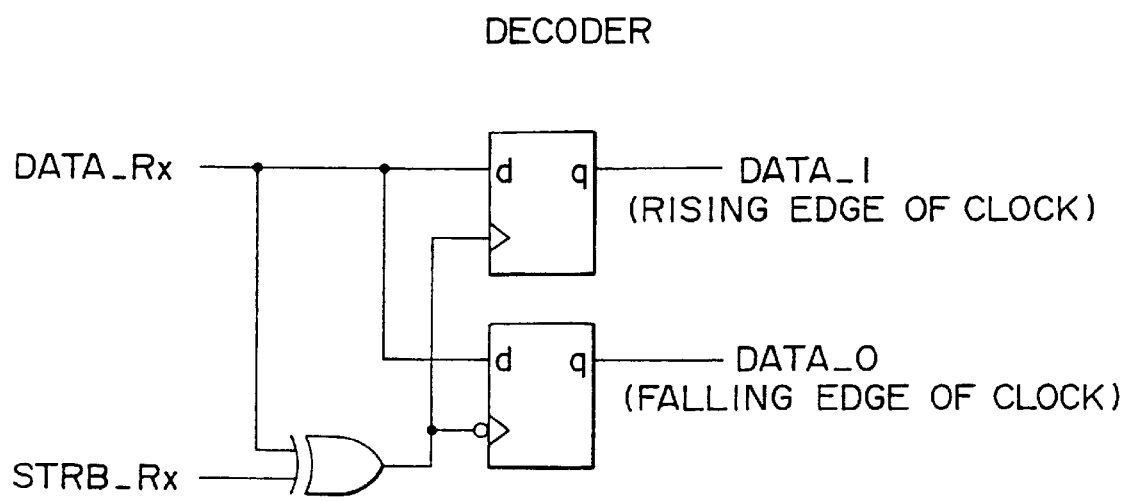

Incidentally, an encoder which produces and outputs NRZ data and a strobe signal from a clock signal and NRZ data is shown in FIG. 5A while a decoder which decodes NRZ data and a clock signal from NRZ data and a strobe signal is shown in FIG. 5B.

Subsequently, communication rules adopted in the bidirectional serial transmission standard IEEE 1394 will be described.

In the bidirectional serial transmission standard IEEE 1394, one second is divided into 8,000 unit transmission sections (each such section will be hereinafter referred to as one cycle), and a predetermined period from the start of each cycle is used as a period within which a video program is distributed from the delivery apparatus 2 to each reception apparatus 4 while a succeeding predetermined period is applied to a period within which a request signal issued from each reception apparatus 4 to the delivery apparatus 2 is accepted by the delivery apparatus 2.

Two methods are prepared for the use of one cycle. According to the first method, the period of one cycle period within which program information can be transmitted from the delivery apparatus 2 to a reception apparatus 4 is divided equally into sub-periods and each of the sub-periods obtained by the equal division is allocated to one of a plurality of reception apparatus 4 so that program information for the various reception apparatus 4 is transmitted time-divisionally. A manner of transmission in this instance is illustrated in FIG. 7A.

Incidentally, in the present embodiment, thirty-nine units reception apparatus 4 are connected to the delivery apparatus 2, and accordingly, the numbers of channel 1 to channel 39 are applied to the individual sub-periods. However, the length of each sub-period varies depending upon the number of units of reception apparatus 4 connected in the system.

In the other method, the entire period of one cycle period within which program information can be transmitted from the delivery apparatus 2 to the reception apparatus 4 is used such that program information destined for the individual reception apparatus 4 is transmitted successively within the period as seen from FIG. 6B. A manner of transmission in this instance is illustrated in FIG. 7B.

In either case, a top period of each cycle is used for transmission of cycle start data indicating the top of the cycle, and a succeeding predetermined period (indicated by ARB in FIGS. 6A and 6B) is used to allocate the right of use of the transmission cables 7, which are a single interrupt request line, in descending order of priority.

Further, at an end of the period within which program information can be transmitted, end data indicating an end of delivery of the program information is delivered.

Incidentally, a short period (gap) provided between each adjacent sub-periods upon transmission illustrated in FIG. 6A is a non-transmission period which is not used for communication.

On the other hand, the period within one cycle period within which request signals issued from the reception apparatus 4 to the delivery apparatus 2 has the same structure in both of the methods, and the first period (denoted by ARB in FIGS. 7A and 7B) is used to allocate the right of use of the transmission cables 7 in descending order of priority so that a plurality of transmission requests will not interfere with each other.

After the period comes to an end, a request signal is transmitted as an asynchronous packet from each reception apparatus 4, and end data is sent upon the ending of the transmission. Incidentally, at the last of one cycle period, an affirmative response period (ACK) for transmitting it to the reception apparatus 4 side that the display unit 3 has received data without an error is provided. Based on the rules described above, the delivery apparatus 2 bidirectionally transmits serial data.

1–4. Operation in Use

When power supply to the entire video on-demand system is made available, the delivery apparatus 2 allocates an identification code ID to each of the reception apparatus 4 using an ID adding function (Self ID function) provided by the bidirectional serial transmission standard IEEE 1394, and then initializes a system control software program for managing the seat numbers of the seats 5 and the reception apparatus 4 in a related condition using the identification codes ID.

After the setting, a passenger can control the control unit 8 prepared for each of the seats 5 to select a channel of a video program to be enjoyed. If a channel is selected by the passenger, then the selection information is transmitted to the control apparatus 4B built in the particular reception apparatus 4 connected to the control unit 8 and sent to the control apparatus 2B of the delivery apparatus 2 via the transmission and reception apparatus 4A.

The control apparatus 2B reads out a video program corresponding to the request signal sent thereto as a request signal from the recording apparatus 2A and sends back the video program to the reception apparatus 4 side via the transmission and reception apparatus 2C.

It is to be noted that, where a plurality of passengers request video programs, the video programs for the different passengers are transmitted time-divisionally.

The data received via the transmission cables 7 are received and decoded by the decoding apparatus 4C of the particular reception apparatus 4 and displayed on the display unit 3. Incidentally, if fast forward, pause or the like of a video program is selected by the passenger, then a corresponding screen is displayed on the display unit 3. Such operation is repetitively performed.

With the construction described above, since the bidirectional serial transmission standard IEEE 1394 described in the item 1–3 above is adopted for data transmission from the delivery apparatus 2 to the reception apparatus 4, the network can be constructed by a daisy chain connection.

Consequently, even in an aircraft which is subject to limitation in installation space, a video on-demand system can be constructed readily.

Further, when it is desired to install an additional reception apparatus or remove one of the reception apparatus 4, since it is only required to additionally connect or disconnect a transmission cable 7 which satisfies the transmission standard described hereinabove to or from such reception apparatus 4, a video on-demand system which is superior also in efficiency in installation operation can be realized.

Further, since the transmission cables 7 which satisfies the bidirectional serial transmission standard IEEE 1394 allows bidirectional transmission, a video on-demand system which is superior in convenience in use to a passenger in that a request from a passenger seated on a seat 5 can be transmitted to the delivery apparatus 2 side.

Further, since ID numbers can be automatically allocated to the seats 5 connected via the transmission cables 7 using the ID adding function (Self ID function) prepared by the bidirectional serial transmission standard IEEE 1394, a video on-demand system which is easy to control can be realized.

2. Large Scale Video On-Demand System

2–1. Basic System Configuration

Figure 8:
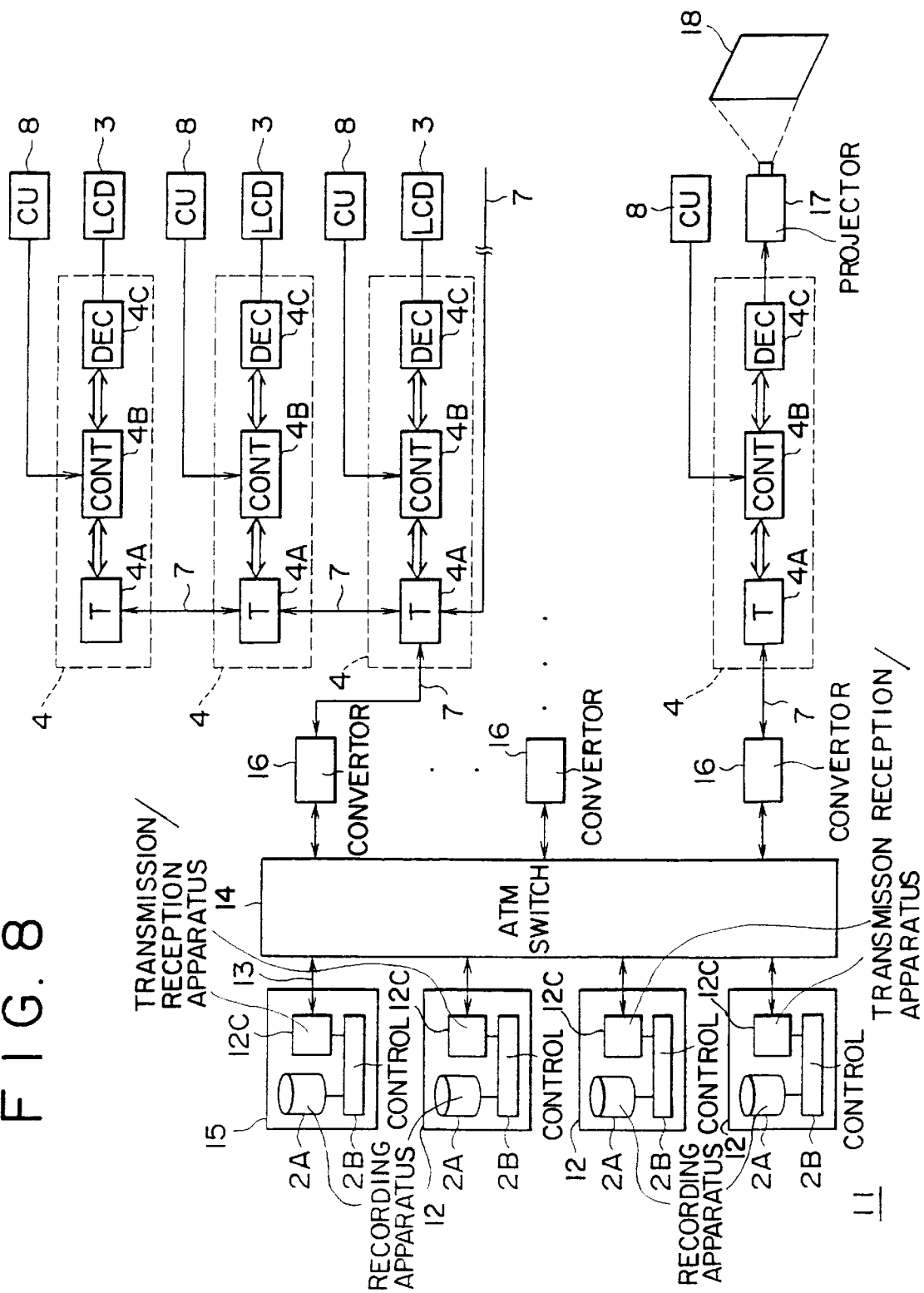
FIG. 8 is a block diagram of a system construction of a video on-demand system showing another preferred embodiment of the present invention.

Referring to FIG. 8 in which like components to those of FIG. 1 are denoted by like reference numerals, there is shown a comparatively large scale video on-demand system wherein 300 to 400 reception apparatus are connected. The video on-demand system is generally denoted at 11 and adopts, as an output of each of a plurality of transmission apparatus 12 which deliver video programs, an ATM (Asynchronous Transfer Mode) standard which is a serial high speed transmission standard and has a free function of switching a destination of distribution by a switch for exclusive use in order to cope with the number of seats of 300 to 400. Further, data of the ATM standard are converted into data of the bidirectional serial transmission standard IEEE 1394 on a transmission line to realize an increase in system scale and elimination of restriction in wiring. The configuration of the video on-demand system 11 will be described in detailed below.

Each of the transmission apparatus 12 includes a transmission and reception apparatus 12C which has a similar construction to the delivery apparatus 2 described hereinabove except that an interface of the ATM standard is used, and delivers video programs corresponding to requests from different passengers from the transmission and reception apparatus 12C to an ATM switch 14 via a transmission cable 13.

It is to be noted that the plurality of delivery apparatus 12 are managed by a single system manager 15 such that control apparatus 2B thereof operate in response to instructions from the system manager 15. Incidentally, the system manager 15 has a similar construction to that of the transmission apparatus 12 and includes a recording apparatus 2A, a control apparatus 2B and a transmission and reception apparatus 12C.

The system manager 15 also switchably controls exchanging switches of the ATM switch 14 such that output destinations of video programs read out from the plurality of transmission apparatus 12 are switched to deliver the video programs to one or more of a plurality of converters 16 to which those reception apparatus 4 which have issued requests are connected.

Each of the converters 16 has two interfaces including an interface for the ATM standard and another interface for the bidirectional serial transmission standard IEEE 1394, and converts data received via one of the interfaces into data for the other interface by a control apparatus and delivers the data after conversion to the other interface.

Each of the converters 16 has a function of establishing matching of an address for the ATM standard interface with an address of the interface of the bidirectional serial transmission standard IEEE 1394. Further, each of the converters 16 allocates, when the system is started, IDS to the individual reception apparatus 4 using the ID adding function (Self ID function) prepared by the bidirectional serial transmission standard IEEE 1394.

Data obtained by conversion of the converters 16 are received and decoded back into video signals by those reception apparatus 4 for which the data are destined. In the video on-demand system 11, a decoded video signal can be projected on a large size screen 18 by a projector 17.

Figure 9:
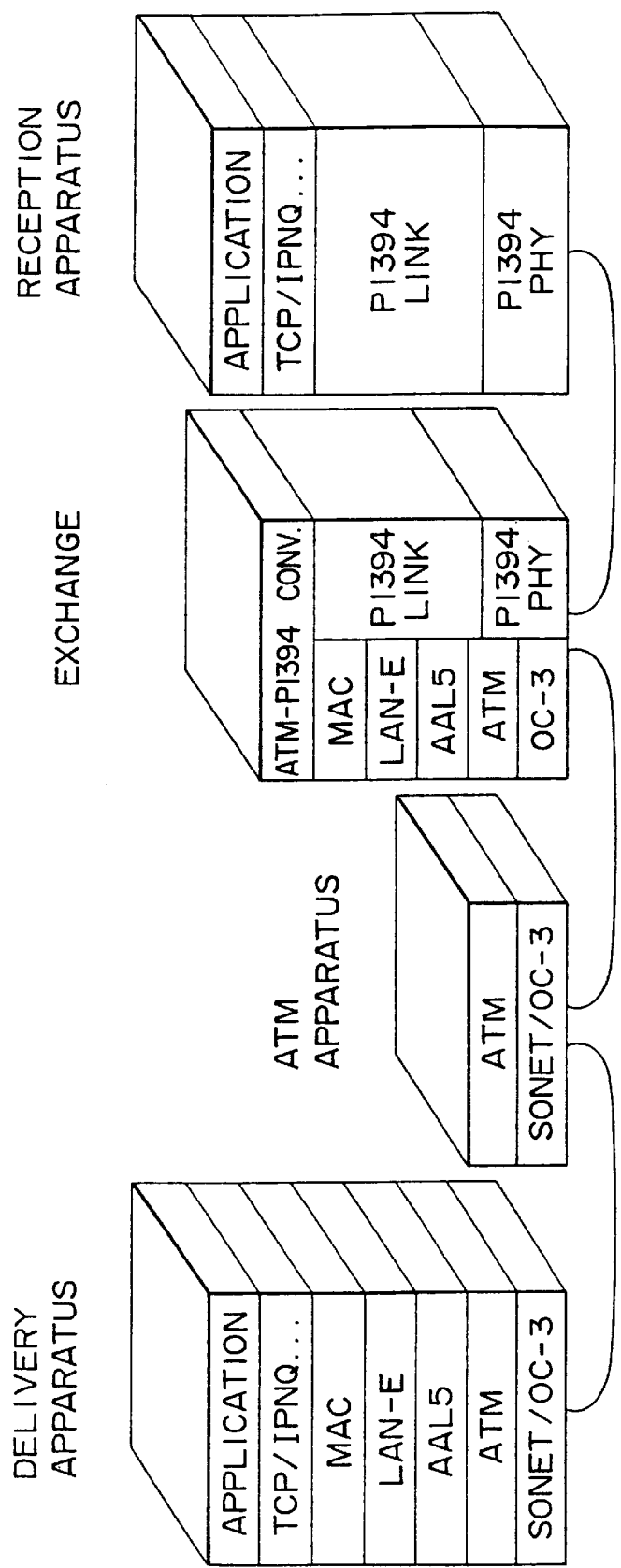
FIG. 9 is a diagrammatic view illustrating a protocol stack.

FIG. 9 shows the video on-demand system 11 represented as a protocol stack corresponding to an OSI (Open Systems Interconnection) basic reference model.

Referring to FIG. 9, "SONET/OC-3", "OC-3" and "P1394PYS" of the lowermost first layer are a physical layer which provides physical conditions of a transmission line. "ATM" of the second layer is a data link layer protocol which takes charge of data transfer control between adjacent apparatus or appliances. Here, the ATM is employed as the transmission system. It is to be noted that "P1394PYS" includes some of functions of the data link layer protocol.

"AAL5" of the third layer is a network layer protocol which takes charge of repeating control in the network of the video on-demand system. "LAN-E" of the fourth layer is a transport layer protocol which takes charge of control of data transfer between a delivery apparatus and a reception apparatus.

"MAC" of the fifth layer is a session layer protocol which takes charge of conversation communication control between a delivery apparatus and a reception apparatus.

"TCP/IPnq" of the sixth layer is a presentation layer protocol which performs instruction, request, response, confirmation and so forth to "APPLICATION" of the seventh layer to make control of the various functions of the session layer and so forth possible and takes charge of control of a conversion method for converting video data and audio data into data of a transfer format to be transferred in the network. It is to be noted that "ATM-P1394 Conv." of the sixth layer of the converter is a protocol which takes charge of a function of bidirectional conversion between data of the ATM standard and data of the bidirectional serial transfer standard IEEE1934.

"APPLICATION" of the seventh layer is an application layer protocol which takes charge of processing of video data and audio data of the MPEG1 format.

It is to be noted that "P1394 LINK" which occupies layers from the second to the fifth layer of the exchange and the reception apparatus is a protocol which takes charge of data transfer between the exchange and the reception apparatus in conformity with the bidirectional serial transfer standard IEEE1934, and includes functions of the protocols of the data link layer, network layer, transport layer and session layer.

2—2. Determination of Number of Delivery Apparatus to Be Installed Based on Number of Seats Here, how to determine the number N of transmission apparatus 12 to be installed based on the number of seats will be described with reference to FIGS. 10 and 11. It is assumed here that the bit rate of a data stream of a video signal and an audio signal of the MPEG1 format is 1.6 Mbps and that the number of seats is 400 and different streams are provided to all of the seats. Further, it is assumed that, in FIG. 10, the unit size of each of the layers represented by TCP to AAL5 is 1 KB.

Under those assumptions, the amount of necessary data to allow moving pictures of 1.6 Mbps to be displayed on the display units 3 mounted on the 400 seats 5 is determined. The data amount is, where data only of video programs are concerned, 80 MBps (=1.6 Mbps×400 seats).

Figure 10:
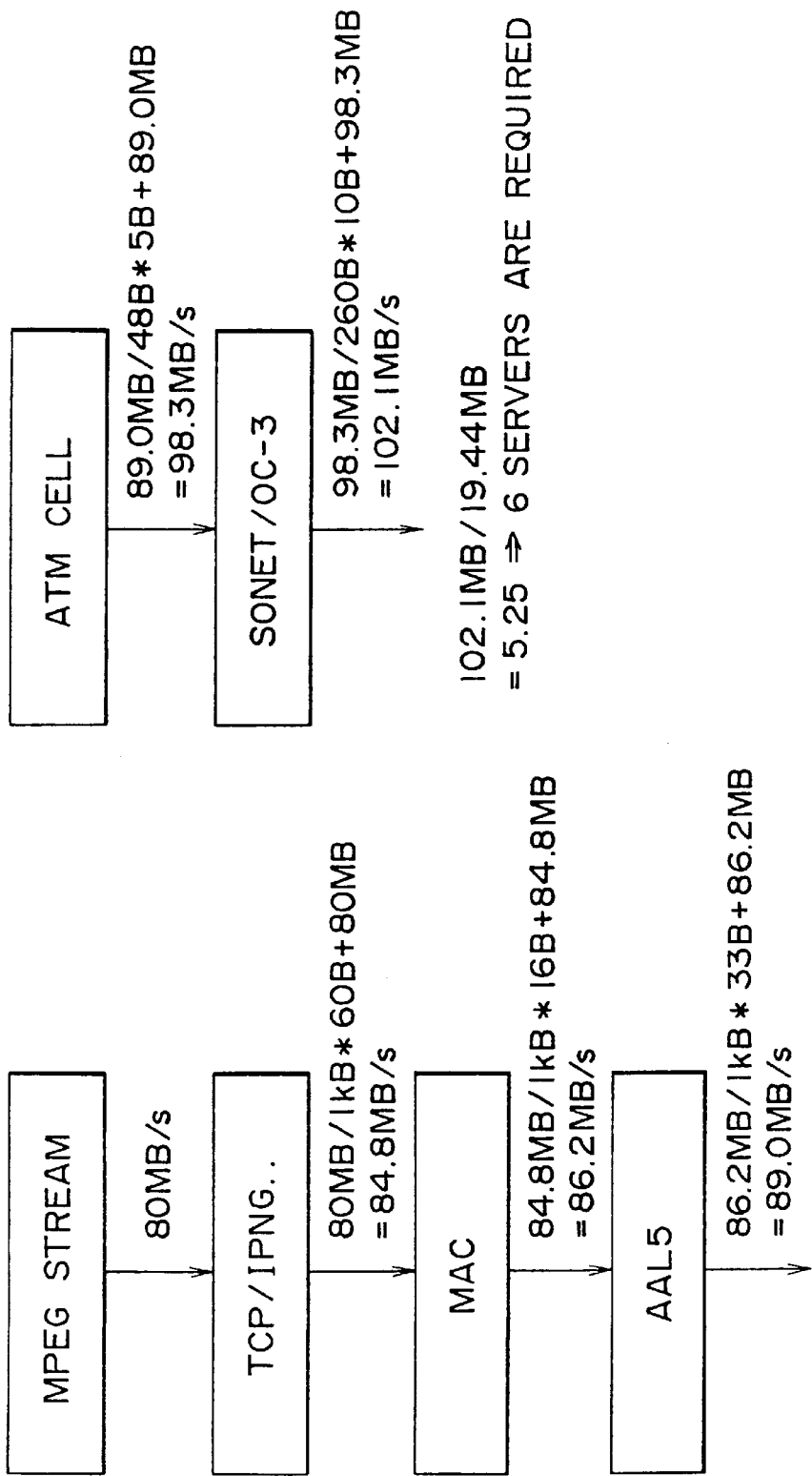
FIGS. 10 and 11 are diagrammatic views illustrating rough estimates of a load on the delivery apparatus side.
Figure 11:
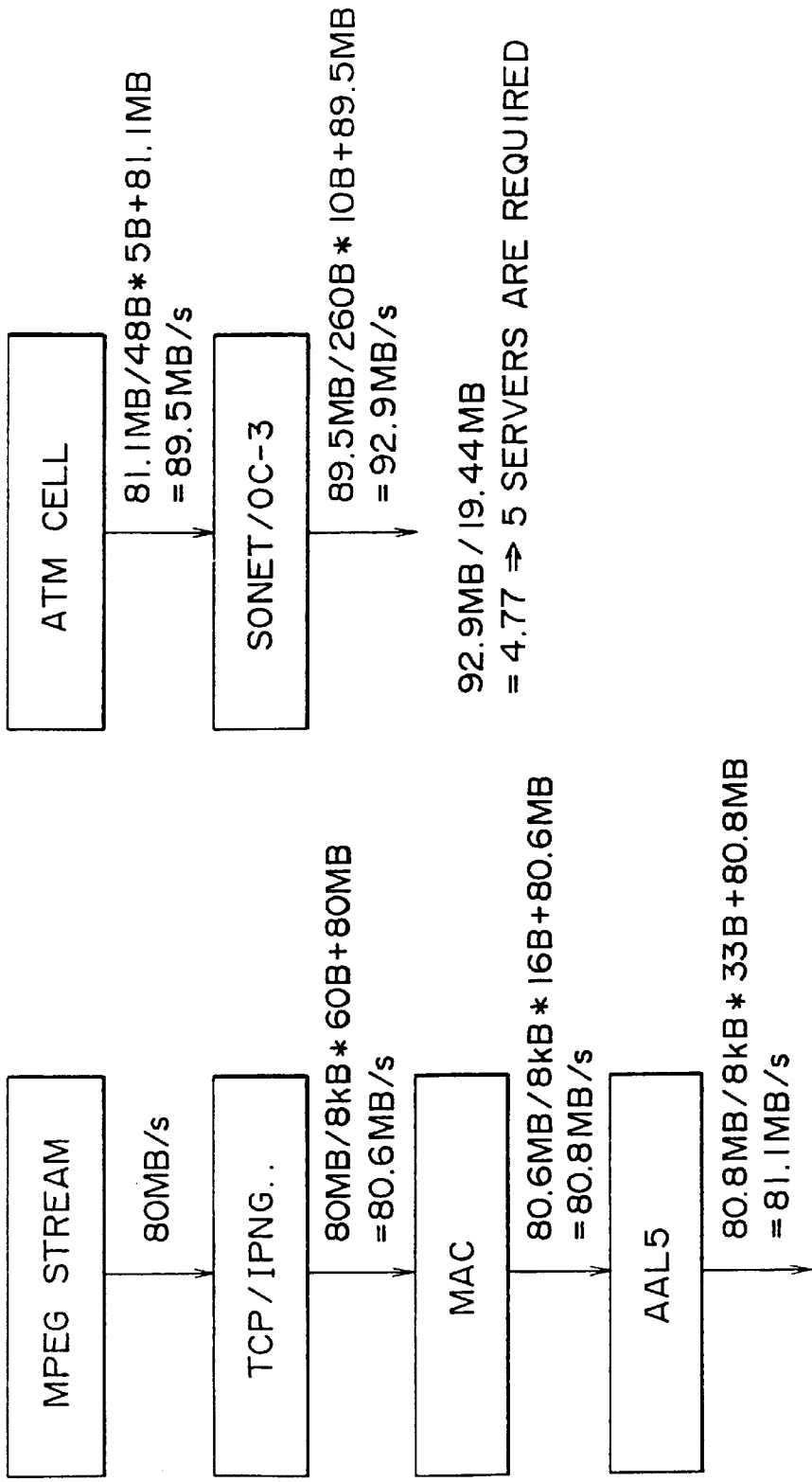
Figure 12:
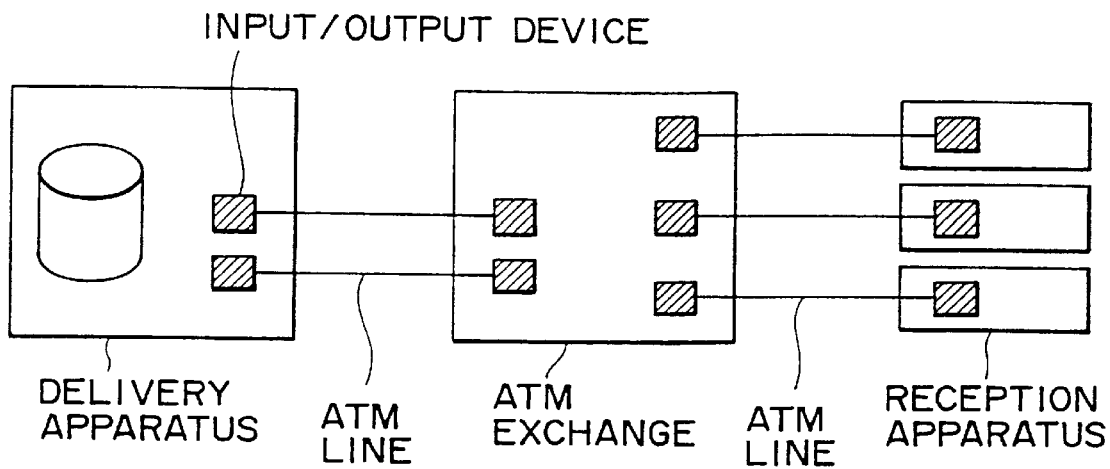
FIG. 12 is a diagrammatic view showing a network system which employs an ATM line.
Figure 13:
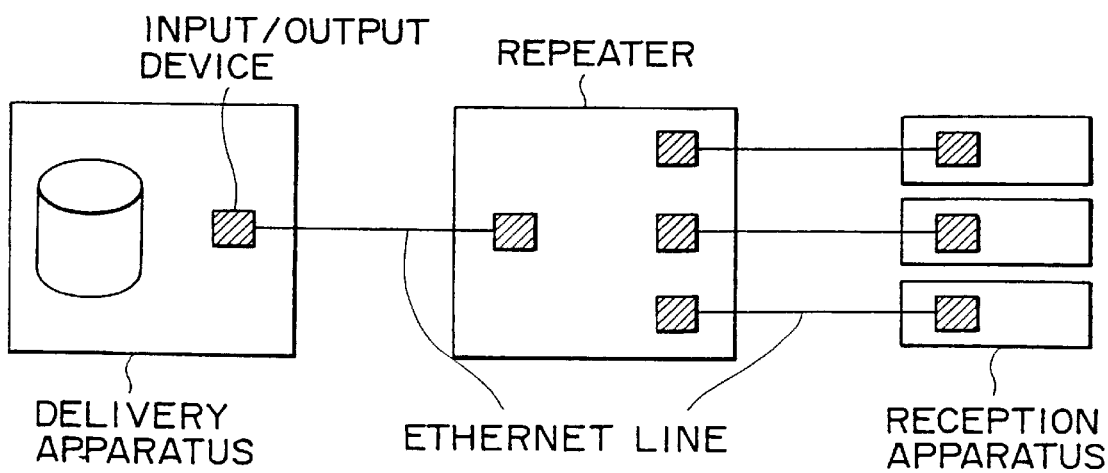
FIG. 13 is a similar view but showing a network system which employs an Ethernet line.

However, while data of the data amount are transmitted, various control data are added to the data as seen in FIG. 10. Consequently, the amount of data to be outputted from the N delivery apparatus 12 finally is 102.1 MB/S.

What number of delivery apparatus 12 should be connected under this condition depends upon the data rate at which one delivery apparatus 12 can output data. Here, if it is assumed that the output data rate of one delivery apparatus 12 is 19.44 MBps, then from the value of 5.25 obtained by dividing the total data amount of 102.1 MB/S by the output data rate of 19.44 MBps, it can be recognized that six delivery apparatus 12 are required.

Further, the number N of required delivery apparatus 12 depends also upon the magnitude of the unit size of each of the layers represented by TCP to AAL5 in each of the delivery apparatus 12. For example, while the unit size in the arrangement of FIG. 10 is 1 KB, where the unit size is 8 KB as in the arrangement of FIG. 11, it can be seen that, from a similar equation, five delivery apparatus 12 should be connected.

In this manner, the number N of delivery apparatus 12 required to construct the video on-demand system 11 depends upon the data rate finally required for the reception apparatus 4 as well as the unit size and the output rate of each layer in the delivery apparatus 12.

2–3. Operation in Use

When the power supply to the entire video on-demand system 11 is made available, the video on-demand system 11 allocates IDs to the individual reception apparatus 4 using the ID adding function (Self ID function) provided in the bidirectional serial transmission standard IEEE 1394, and establishes matching of an address for the ATM interface with an address for the bidirectional serial transmission standard IEEE 1394 and initializes a system management program so that the system may operate regularly. Thereafter, a passenger will control the control unit 8 prepared for each of the seats 5 to select a channel of a video program to be enjoyed. The selection information of the channel is transmitted to the control apparatus 4B built in the particular reception apparatus 4 connected to the control unit 8 and then delivered to the transmission cables 7 via the transmission and reception apparatus 4A.

The selection information is converted into data of the ATM standard by the associated converter 16 and then inputted to the system manager 15 via the ATM switch 14.

Similarly, selection information obtained with regard to the reception apparatus 4 for the projector is provided to the system manager 15 along a similar route.

The system manager 15 sends a control signal to a relevant one of the plurality of delivery apparatus 12 in response to the information so that a video program requested by the passenger is read out from the recording apparatus 2A of the delivery apparatus 12.

In this instance, for the video program to be delivered to the reception apparatus 4 connected to the seat 5, an ordinary image (MPEG1 format image) is read out, but for video program to be forward to the reception apparatus 4 which reflects an image by means of the projector 17, a high definition image (MPEG2 format image) is read out, and delivered to the ATM switch 14.

Such video programs are delivered to the individual reception apparatus 4. However, where the high definition image (MPEG2 format image) is concerned, since it includes a larger amount of information than an ordinary image, the data thereof are transmitted using a plurality of channels into which one cycle is divided as seen in FIG. 6A or using the entire one cycle as seen in FIG. 6B.

Then, a video program of contents decoded by each of the reception apparatus 4 is displayed on the display screen of the reception apparatus 4 of the corresponding seat 5 or on the project screen.

With the video on-demand system of the construction described above, since the bidirectional serial transmission standard IEEE 1394 is employed for data transmission to the reception apparatus 4, the network extending from the converters 16 to the passenger's seats can be constructed by a daisy chain connection.

Consequently, the video on-demand system can be constructed readily even in an aircraft which is subject to limitation in installation space.

Further, since the delivery side with respect to the converters 16 is constructed from a network of the ATM standard while the reception side with respect to the converters 16 is constructed from a network of the bidirectional serial transmission standard IEEE 1394, a video on-demand system which can distribute, even if the system scale is expanded, information of a large capacity conforming to the expanded large scale in a short time and whose system scale can be expanded readily can be realized.

Further, even when it is desired to provide an additional reception apparatus or remove a reception apparatus 4, since it is required only to connect or remove a transmission cable 7, which satisfies the bidirectional serial transmission standard IEEE 1394, to or from an adjacent reception apparatus 4, a video on-demand system which is superior in efficiency in installation operation can be realized.

Further, since a transmission cable 7 which satisfies the bidirectional serial transmission standard IEEE 1394 allows bidirectional transmission, a video on-demand system which is superior in convenience of use in that a request from a passenger seated on any seat 5 can be transmitted to the delivery apparatus 12 side can be realized.

Furthermore, since ID numbers can be allocated automatically to the seats connected via the transmission cables 7 using the ID adding function (Self ID function) prepared in the bidirectional serial transmission standard IEEE 1394, a video on-demand system which is easy to manage can be realized.

3. Other Embodiments

While the foregoing description relates to the configuration wherein the delivery apparatus 12 and the reception apparatus 4 are directly connected to each other and the configuration wherein the delivery apparatus 12 and the reception apparatus 4 are connected to each other via the ATM switch 14 and the converters 16, the present invention is not limited to those configurations, and a repeater which distributes or transfers a signal inputted thereto to a large number of loads may be interposed in a network by which data are transmitted in conformity with the bidirectional serial transmission standard IEEE 1394. Where the transmission cables 7 described above are employed, since also dc power supply is supplied to them, the repeater can be used always in an active state irrespective of the state of the loads (reception apparatus). Thus, a video on-demand system which can transmit data without taking the possibility of reflection from or interference by any load (reception apparatus) into consideration can be realized.

Further, while, in the embodiments described above, a plurality of delivery apparatus 12 are connected to one of the converters 16 via the ATM switch 14, the present invention is not limited to the specific connection, and a single delivery apparatus 12 which outputs data in conformity with the ATM standard may be employed while data outputted from the delivery apparatus 12 are distributed to the reception apparatus 4 by a converter 16 which converts the data into data of the bidirectional serial transmission standard IEEE 1394.

Further, while, in the embodiments described above, video programs stored in the recording apparatus 2A built in the delivery apparatus 12 are stored in three types of images including a still picture (JPEG), an ordinary image (MPEG1) and a high definition image (MPEG2), the present invention is not limited to such storage, and any one or two of the three types of images may be stored.

Further, while, in the embodiments described above, a video on-demand system is constructed in an aircraft, the present invention is not limited to the specific location and can be applied widely in order to construct a video on-demand system in various mobile bodies such as a ship and a passenger carriage.

Further, the present invention can be applied not only to such mobile bodies, but can be applied widely also where a video on-demand system of the type described above is constructed in a lodging equipment. Where the video on-demand system described above is employed, even when modification to the network is required, it is only required to connect a transmission cable to an adjacent reception apparatus. Consequently, an additional reception can be installed very readily.

Further, while, in the embodiments described above, both of a video signal and an audio signal are delivered as a video program into a transmission line, the present invention is not limited to a system of the specific type, but can be applied widely to another system which distributes only a video signal or only an audio signal.

Further, while, in the embodiments described above, data of a video program are transmitted in an asynchronous fashion from a delivery apparatus 2 and converted into data of the bidirectional serial transmission standard IEEE 1394 by a converter 16, the present invention is not limited to the specific configuration, and data of a video program may be transmitted in a synchronous fashion from a delivery apparatus 2 and converted into data of the bidirectional serial transmission standard IEEE 1394 by a converter 16.

Having now fully described the invention, it will be apparent to one of ordinary skill in the art that many changes and modifications can be made thereto without departing from the spirit and scope of the invention as set forth herein.

What is claimed is:

1. A video on-demand system wherein video programs are selectively supplied and displayed in response to requests of viewers in a physically limited space, the system comprising:

storage means for storing a plurality of video programs;

a delivery apparatus for selectively reading out and delivering, in response to request signals derived from the requests of the viewers, video information of the plurality of video programs, wherein each of the plurality of video programs is stored in the form of compressed codes in said storage means;

communication line means formed of a set of lines including a data line for serially transmitting the video information at a data rate equal to or higher than 100 Mbps, a strobe line for transmitting a strobe signal for regeneration of a clock signal to be used to transmit the video information, and a power supply line for supplying dc power;

a plurality of reception apparatus connected in a daisy chain connection to said delivery apparatus by said communication line means for outputting the request signals and selectively receiving the video information;

a plurality of reception apparatus installation means in a predetermined arrangement and having said plurality of reception apparatus respectively installed individually therein for allowing the viewers to view selected video programs; and line laying means provided between said delivery apparatus and said plurality of reception apparatus and connecting said plurality of reception apparatus in a daisy chain connection to said delivery apparatus.

2. The video on-demand system according to claim 1, wherein said communication line means further includes a bidirectional communication line.

3. The video on-demand system according to claim 1, wherein said storage means stores the video information by performing at least two types of compression coding, each of different respective picture qualities, for the video information of the same contents including a first compression coding and a second compression coding, said second compression coding providing a more definite picture quality than a picture quality provided by said first compression coding.

4. The video on-demand system according to claim 3, wherein at least one of said plurality of reception apparatus includes a projector, and the at least one reception apparatus including said projector requests said delivery apparatus to supply the video information obtained by the second compression coding and displays using said projector an image based on the image information obtained by the second compression coding and read out from said storage means.

5. The video on-demand system according to claim 4, wherein each of said plurality of reception apparatus not including said projector includes a liquid crystal display unit and requests said delivery apparatus to supply the video information obtained by the first compression coding and displays on said liquid crystal display unit an image based on the video information obtained by the first compression coding read out from said storage means.

6. The video on-demand system according to claim 4, wherein said storage means includes means for storing the video information obtained by MPEG2 coding as the second compression coding.

7. The video on-demand system according to claim 5, wherein said storage means includes means for storing the video information obtained by MPEG1 coding as the first compression coding.

8. The video on-demand system according to claim 1, wherein the physically limited space comprises seating in an aircraft.

9. The video on-demand system according to claim 1, wherein said reception apparatus installation means are arranged in a matrix in the physically limited space.

10. A video on-demand system wherein a plurality of video programs are selectively supplied and displayed in response to requests of viewers in a physically limited space, the system comprising:

storage means;

a serial interface;

a delivery apparatus responsive to request signals for selectively reading out and delivering video information in the form of compressed codes of the plurality video programs stored in said storage means via said serial interface;

a converter for converting the video information delivered from said delivery apparatus into a set of video information and a strobe signal for regeneration of a clock signal included in the video information;

communication line means including a set of lines having a data line for serially transmitting the set of video information from said converter at a data rate equal to or higher than 100 MBps, a strobe line for transmitting the strobe signal for regeneration of the clock signal for use in transmitting the video information, and a power supply line for supplying dc power;

a plurality of reception apparatus connected in a daisy chain connection to said delivery apparatus by said communication line means for outputting the request signals and for selectively receiving the video information;

a plurality of reception apparatus installation means arranged in a predetermined form and having said plurality of reception apparatus installed respectively therein for allowing the viewers to view selected video programs; and line laying means provided between said delivery apparatus and said plurality of reception apparatus for connecting said plurality of reception apparatus in the daisy chain connection to said delivery apparatus.

11. A video on-demand system according to claim 10, wherein said communication line means further includes a bidirectional communication line.

12. A video on-demand system according to claim 10, wherein said storage means stores the video information by performing at least two types of compression coding of different picture qualities for the video information of the same contents including a first compression coding and a second compression coding, said second compression coding providing a more definite picture quality than a picture quality provided by said first compression coding.

13. A video on-demand system according to claim 12, wherein at least one of said plurality of reception apparatus includes a projector and said delivery apparatus supplies the video information obtained by the second compression coding, so that said projector displays an image based on the video information obtained by the second compression coding.

14. A video on-demand system according to claim 13, wherein each of said plurality of reception apparatus other than said at least one reception apparatus which includes said projector includes a crystal display unit and means for requesting said delivery apparatus to supply the video information obtained by the first compression coding, so that said liquid crystal display unit displays an image based on the video information obtained by the first compression coding.

15. The video on-demand system according to claim 13, wherein said storage mans stores the video information obtained by MPEG2 coding as the second compression coding.

16. The video on-demand system according to claim 14, wherein said storage means stores the video information obtained by MPEG 1 coding as the first compression coding.

17. The video on-demand system according to claim 10, wherein the physically limited space is inside an aircraft.

18. The video on-demand system according to claim 10, wherein said plurality of reception apparatus installation means are arranged in a matrix in the physically limited space.

19. A video on-demand system wherein a plurality of video programs are selectively supplied and displayed in response to requests of viewers located in a physically limited space, the system comprising:

storage means;

a plurality of delivery apparatus responsive to request signals for selectively reading out and delivering video information of the video programs in the form of compressed codes stored in said storage means;

exchange means for selectively connecting said plurality of delivery apparatus and first communication line means;

a converter for converting the video information supplied thereto from said exchange means via said first communication line means into a set of video information and a strobe signal for regeneration of a clock signal included in the video information;

second communication line means including a set of lines having a data line for serially transmitting the video information from said converter at a data rate equal to or higher than 100 Mbps, a strobe line for transmitting the strobe signal for regeneration of the clock signal for use in delivering the video information and a power supply line for supplying dc power;

a plurality of reception apparatus connected in a daisy chain connection to said delivery apparatus by said second communication line means for outputting the request signals and selectively receiving the video information;

a plurality of reception apparatus installation means arranged in a predetermined form and having said plurality of reception apparatus installed respectively therein for allowing the viewers to view selected video programs; and line laying means provided between said delivery apparatus and said plurality of reception apparatus for connecting said plurality of reception apparatus in a daisy chain connection to said plurality of delivery apparatus.

20. The video on-demand system according to claim 19, wherein said second communication line means comprises a bidirectional communication line.

21. The video on-demand system according to claim 19, wherein said storage means stores the video information obtained by performing at least two types of compression coding of different respective picture qualities for the video information of the same content including a first compression coding and a second compression coding providing a more definite picture quality than a picture quality provided by said first compression coding.

22. The video on-demand system according to claim 21, wherein at least one of said plurality of reception apparatus includes a projector and means for requesting said delivery apparatus to supply the video information obtained by the second compression coding, so that said projector displays an image based on the video information obtained by the second compression coding.

23. The video on-demand system according to claim 22, wherein each of said plurality of reception apparatus other than said at least one reception apparatus which includes said projector includes a liquid crystal display unit and means for requesting said delivery apparatus to supply the video information obtained by the first compression coding, so that said liquid crystal display unit displays an image based on the video information obtained by the first compression coding.

24. The video on-demand system according to claim 22, wherein said storage means includes means for storing the video information obtained by MPEG2 coding as the second compression coding.

25. The video on-demand system according to claim 23, wherein said storage means includes means for storing the video information obtained by MPEG1 coding as the first compression coding.

26. The video on-demand system according to claim 19, wherein the physically limited space comprises seating in an aircraft.

27. The video on-demand system according to claim 19, wherein said plurality of reception apparatus installation means are arranged in a matrix in the physically limited space.

* * * * *